H. W. POWELL.
COLTER OILER.
APPLICATION FILED JAN. 24, 1917.
1,275,597.
Patented Aug. 13, 1918.
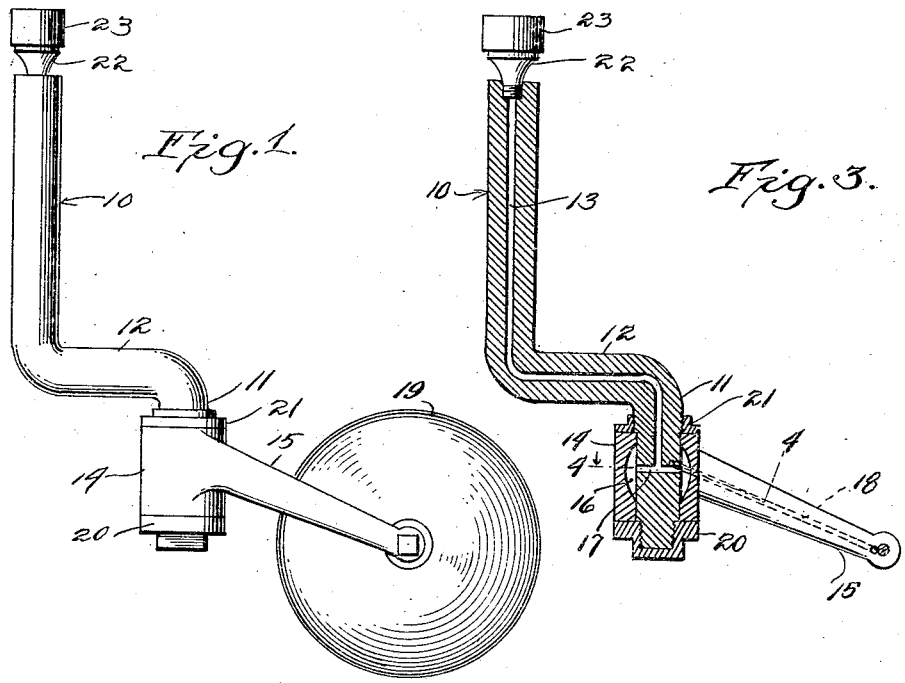
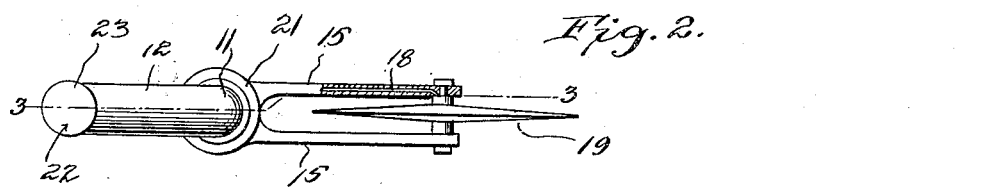
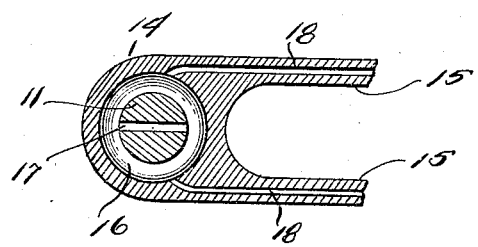
Inventor
H. W. Powell
By Chandler & Chandler
Attorneys
Witnesses

UNITED STATES PATENT OFFICE.

HARRY W. POWELL, OF PATON, IOWA.

COLTER-OILER.

1,275,597.  Specification of Letters Patent.  Patented Aug. 13, 1918.

Application filed January 24, 1917. Serial No. 144,220.

*To all whom it may concern:*

Be it known that I, HARRY W. POWELL, a citizen of the United States, residing at Paton, in the county of Greene, State of Iowa, have invented certain new and useful Improvements in Colter-Oilers; and I do hereby declare the following to be a full, clear, and exact description of the invention, such as will enable others skilled in the art to which it appertains to make and use the same.

This invention relates to improvements in oiling devices and particularly to oiling devices for rolling colters, which are used on plows, or like agricultural implements and machines.

One object of the invention is to provide a simple device of this character wherein the joint between the shank and fork of the colter will be effectively lubricated at all times.

Another object is to provide a device of this character wherein the shaft of the colter will be kept in proper lubricated condition through the means which lubricates the above mentioned joint between the shank and fork of the colter.

Other objects and advantages will be apparent from the following description when taken in connection with the accompanying drawing.

In the drawing:

Figure 1 is a side elevation of a colter constructed in accordance with my invention.

Fig. 2 is a top plan view of the device.

Fig. 3 is a transverse sectional view taken on the line 3—3 of Fig. 2.

Fig. 4 is a transverse sectional view taken on the line 4—4 of Fig. 3.

Referring particularly to the accompanying drawing, 10 represents the vertical shank of the colter. The lower portion of the shank is formed with the offset portion 11, which is connected with the main portion 12 by means of the horizontal portion 12. Formed centrally through the entire shank, that is from the upper end of the vertical portion to the lower end of the offset portion, is a channel or bore 13, through which the lubricant is adapted to pass. Engaged on the offset portion is the cylindrical head 14 of the forks 15 of the colter. In the center of this head there is formed an approximately spherical cavity or chamber 16, the lower end of the before-mentioned bore 13 communicating with this chamber by means of the transverse passage 17. Formed longitudinally through the forks are channels or bores 18, the upper ends of which communicate with the said chamber 16 to receive lubricant therefrom. The lower ends of the bores 18 are disposed to discharge lubricant onto the axle or shaft of the blade 19 of the colter. A cap nut 20 is engaged on the lower end of the offset portion of the shank, below the lower end of the head to retain the head on said portion. On the offset portion, above the head, is engaged a lock nut 21 which also serves to hold the head in proper position on the shank.

Removably engaged in the upper end of the main channel or bore 13 is an oil cup 22, the same being of the force feed type, that is having the internally threaded cap 23 which is adapted to be screwed down on the cup to force the lubricant into the bore.

It will thus be seen that the lubricant will pass down through the bore 13 into the chamber 16, of the head, thereby providing proper lubrication to the head and shank. This chamber will eventually fill with lubricant, and the surplus thus accumulated therein, will pass out through the channels of the forks to the axle of the colter wheel. Thus the chamber 16 serves as the oil cup for the axle, and as the means for lubricating the shank and head.

What is claimed is:

An oiling device for a caster wheel, colter, or like swiveled wheel, including a pintle having a longitudinal oil conduit formed therein and having lateral branches in the lower end thereof, a hollow member rotatably engaged on the said lower end of the pintle and having a downwardly inclined arm formed thereon, said arm having a longitudinal oil conduit therethrough the upper end of which communicates with the interior of the hollow member, the interior wall of the hollow member being formed with an oil receiving groove surrounding the lower end of the pintle and receiving oil from said branches.

In testimony whereof, I affix my signature, in the presence of two witnesses.

HARRY W. POWELL.

Witnesses:
C. A. CHALLGREN,
SEYMOUR TOMLIN.

Copies of this patent may be obtained for five cents each, by addressing the "Commissioner of Patents, Washington, D. C."